United States Patent
Moore et al.

(10) Patent No.: US 10,160,432 B2
(45) Date of Patent: Dec. 25, 2018

(54) METHOD AND SYSTEM FOR ACTUATING A VACUUM PUMP ASSOCIATED WITH A BRAKE BOOSTER

(71) Applicant: Ford Global Technologies, LLC, Dearborn, MI (US)

(72) Inventors: Ian Moore, Pulheim (DE); Christian Schmaler, Aachen (DE); Matthias Baumann, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/292,695

(22) Filed: Oct. 13, 2016

(65) Prior Publication Data

US 2017/0106847 A1 Apr. 20, 2017

(30) Foreign Application Priority Data

Oct. 14, 2015 (DE) .......................... 10 2015 219 944

(51) Int. Cl.
  *B60T 13/58* (2006.01)
  *B60T 13/72* (2006.01)
  *B60T 13/52* (2006.01)

(52) U.S. Cl.
  CPC .............. *B60T 13/72* (2013.01); *B60T 13/52* (2013.01)

(58) Field of Classification Search
  CPC ........ B60T 13/52; B60T 13/72; B60T 13/586; B60T 13/161; F02N 11/084
  USPC ..................................... 303/3, 10, 11, 15, 20
  See application file for complete search history.

(56) References Cited

U.S. PATENT DOCUMENTS

| | | | | |
|---|---|---|---|---|
| 8,468,879 B2* | 6/2013 | Rollinger | ............... | G01M 3/26 |
| | | | | 73/114.77 |
| 8,989,992 B2 | 3/2015 | Lippok | | |
| 2010/0332097 A1* | 12/2010 | Lippok | ................. | B60T 13/662 |
| | | | | 701/70 |
| 2011/0112774 A1* | 5/2011 | Gilles | .................. | B60T 8/4059 |
| | | | | 702/50 |
| 2012/0253574 A1* | 10/2012 | Krueger | ................. | B60T 8/4036 |
| | | | | 701/22 |
| 2014/0110994 A1* | 4/2014 | Gruber | ................. | B60T 13/146 |
| | | | | 303/3 |
| 2014/0119951 A1* | 5/2014 | Makino | ..................... | F04B 7/02 |
| | | | | 417/53 |
| 2014/0137544 A1* | 5/2014 | Pursifull | ................. | B60T 13/66 |
| | | | | 60/327 |

(Continued)

FOREIGN PATENT DOCUMENTS

| | | |
|---|---|---|
| DE | 102004052781 A1 | 5/2006 |
| DE | 102011050736 A1 | 12/2012 |
| DE | 102012219193 A1 | 4/2014 |

*Primary Examiner* — Christopher P Schwartz
(74) *Attorney, Agent, or Firm* — Raymond L. Coppiellie; Burgess Law Office, PLLC

(57) ABSTRACT

A method for actuating an electric vacuum pump of a brake booster including indirectly ascertaining a negative pressure in the brake booster. Depending on the indirectly ascertained negative pressure, and on a pumping capacity of the vacuum pump, ascertaining at least one activation parameter for the vacuum pump. Activating the vacuum pump in accordance with the activation parameter, when the indirectly ascertained negative pressure drops below a predefined minimum value.

20 Claims, 1 Drawing Sheet

(56) References Cited

U.S. PATENT DOCUMENTS

| | | | |
|---|---|---|---|
| 2014/0288794 A1* | 9/2014 | Yoo | B60T 8/171 |
| | | | 701/70 |
| 2015/0076897 A1* | 3/2015 | Akita | B60T 13/52 |
| | | | 303/12 |
| 2015/0098847 A1* | 4/2015 | Sugimoto | B60T 17/02 |
| | | | 417/423.12 |
| 2016/0052499 A1* | 2/2016 | Sekiya | B60T 13/72 |
| | | | 303/12 |
| 2017/0088108 A1* | 3/2017 | Sekiya | B60T 13/72 |

* cited by examiner

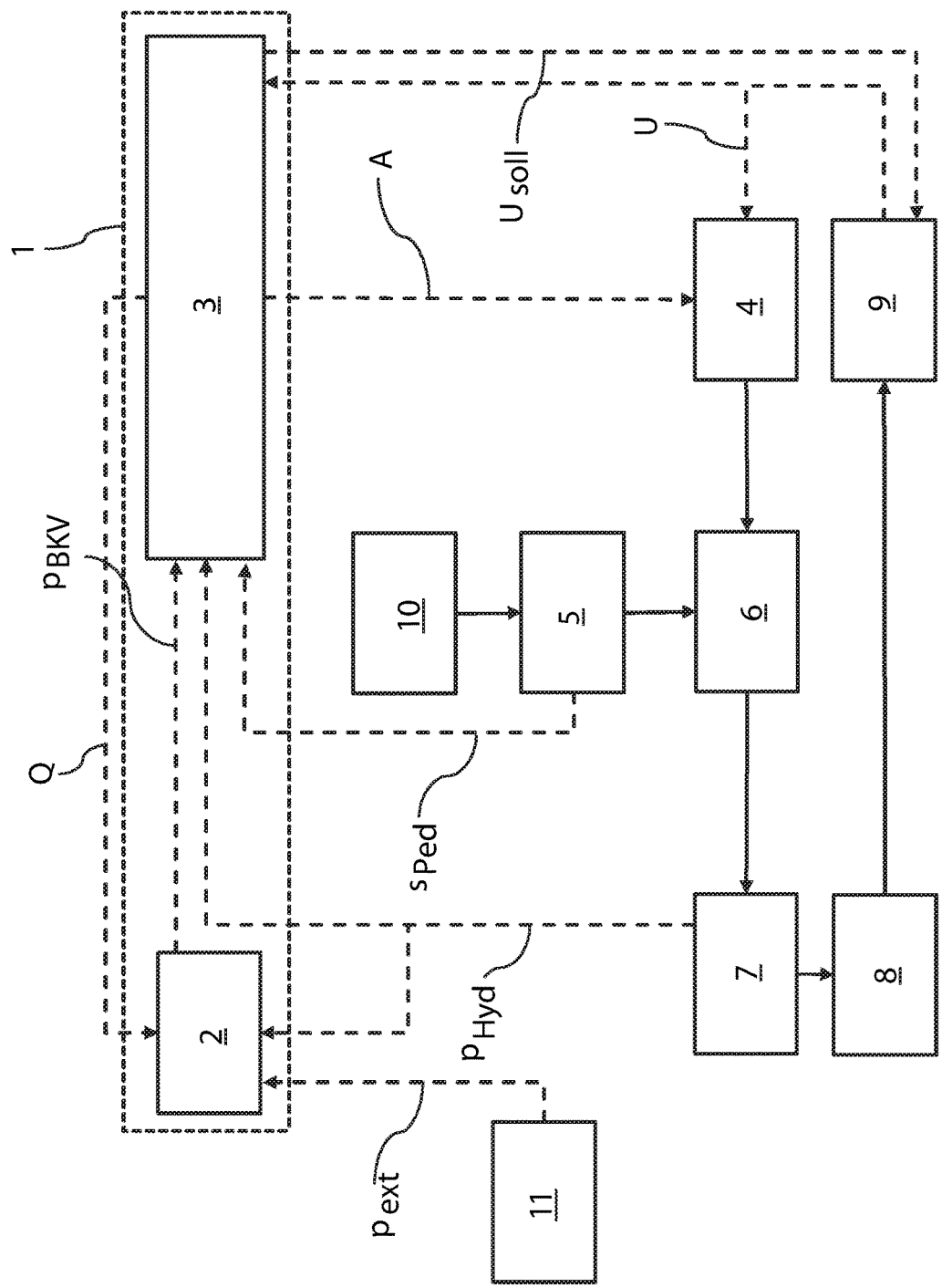

METHOD AND SYSTEM FOR ACTUATING A VACUUM PUMP ASSOCIATED WITH A BRAKE BOOSTER

CROSS-REFERENCE TO RELATED APPLICATIONS

Not Applicable.

BACKGROUND OF THE INVENTION

1. Field of the Invention

The invention relates to a vehicle brake system, and more specifically, to a method and system for actuating an electric vacuum pump associated with a brake booster.

2. Description of Related Art

In motor vehicles, brake boosters boost the force applied by a driver to assist driver operation of a brake pedal. Conventional designs include a negative-pressure brake booster that uses a pressure difference to generate a force. A piston arranged in a chamber is coupled to the main brake cylinder. When not in operation, negative pressure exists on both sides of the working piston. Upon brake pedal actuation, the side facing towards the brake pedal is placed at ambient pressure. The negative pressure on the opposite side generates a force that acts on the main brake cylinder.

In the case of motor vehicles having an internal combustion engine, a connection to the intake manifold of the engine provides the negative pressure. Some motor vehicles, in particular an electric or hybrid vehicle, use an electrically operated vacuum pump to provide the negative pressure. The electrically operated vacuum pump connects to the brake booster and generates the negative pressure necessary for operation thereof.

Monitoring the pressure or negative pressure prevailing in the brake booster determines availability of sufficient auxiliary braking force. Since any braking operation causes air to flow into the brake booster and bring about at least partial pressure compensation, the vacuum pump reestablishes the vacuum. However, operating the vacuum pump constantly, even when the pressure in the brake booster has a sufficiently low value, is uneconomical, reduces pump service life, and a power source unnecessarily loads the pump.

Using a negative pressure sensor on the brake booster and comparing a current negative pressure value with a threshold value provides a mechanism for switching on the pump only as required; specifically, restarting the vacuum pump when the negative pressure value drops below the threshold value. Using a sensor of this type increases the costs, weight, and complexity of the vehicle.

In some instances, brake boosters producing negative pressure by a connection to the intake manifold may do so without a pressure sensor on the brake booster.

SUMMARY OF THE INVENTION

A method for actuating an electric vacuum pump of a brake booster including indirectly ascertaining a negative pressure in the brake booster. Determining a pumping capacity of and ascertaining at least one activation parameter for the vacuum pump; and activating the vacuum pump based on at least one activation parameter when the ascertained negative pressure drops below a predefined minimum value.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a schematic, block diagram of a system according to one example of the invention.

DETAILED DESCRIPTION OF THE PREFERRED EMBODIMENTS

The following description of the preferred embodiment(s) is merely exemplary in nature and is in no way intended to limit the invention, its application, or uses.

FIG. 1 is a block diagram showing a control device 1 in conjunction with a motor vehicle 9. The control device 1 includes a negative pressure estimation unit 2 and a pump control unit 3. The pump control unit 3 controls a vacuum pump 4 through an activation signal A. As shown, the vacuum pump 4 connects to a brake booster 6.

The vacuum pump 4 operates electrically and receives a supply voltage U from one or more batteries (not shown) of the motor vehicle 9. The brake booster 6, connects to a main brake cylinder (not shown) and is actuated through a brake pedal 5 operated by a driver 10. The brake booster 6 acts on an electronic brake module 7, which produces a hydraulic brake pressure forwarded from the brake module 7 to a brake system 8. The brake system 8 brings about a braking of the vehicle 9.

The brake booster 6 formed, as known, as a negative pressure brake booster having a chamber with a movable working piston (neither of which is shown here) and is connected to the vacuum pump 4 in such a way to generate a negative pressure in the brake booster 6. A check valve is typically provided between the vacuum pump 4 and brake booster 6. Operation of the vacuum pump 4 leads to a negative pressure gain in the brake booster 6, and operation of the brake pedal 5 brings about a partial ventilation and thus a negative pressure loss. This negative pressure loss can cause the negative pressure in the brake booster 6 to fall below a predefined minimum value, at which insufficient boosting of the braking force is provided and at which the driver 10 perceives the behavior of the brake to be unnatural. To prevent this, operation of the vacuum pump 4 compensates for the negative pressure loss.

To minimize wear of the vacuum pump 4 and limit the energy consumption thereof, activation of the vacuum pump 4 should occur, where possible, only when the current value of the negative pressure in the brake booster 6 makes this necessary. To implement this, it is necessary for the pump control unit 3 to receive information about the present negative pressure. For this purpose, a value for the negative pressure $p_{BKV}$ is delivered from the negative pressure estimation unit 2 to the pump control unit 3. However, the negative pressure $p_{BKV}$ is not a measured value obtained by means of a sensor on the brake booster 6. Instead, the negative pressure estimation unit 2 indirectly ascertains the negative pressure $p_{BKV}$. The negative pressure estimation unit 2 continuously or quasi-continuously offsets the negative pressure loss with the negative pressure gain, i.e. sets these off against one another. To calculate the negative pressure loss, a value for the hydraulic pressure $p_{Hyd}$ received from the electronic brake module 7 and a value for an ambient pressure $p_{Ext}$ received from an ambient pressure data source 11 (for example a pressure sensor) are used. A corresponding pressure sensor can be physically arranged in the ambient surroundings of the brake booster 6. Since the current hydraulic pressure $p_{Hyd}$ is a measure for the travel of the piston in the brake booster 6, it is possible to determine, in combination with information about the ambient pressure $p_{Ext}$, the extent to which the negative pressure $p_{BKV}$ reduces because of the current braking process. Alternatively, to the hydraulic pressure $p_{Hyd}$, a signal providing information about the operation travel sped of the brake pedal could be used, since this also allows a conclusion regarding the travel of the specified piston.

To ascertain the negative pressure gain, the negative pressure estimation unit 2 receives a signal characterizing the pumping capacity Q of the vacuum pump 4. The pumping capacity Q designates the volume flow that the vacuum pump 4 is conveying or can convey. The corresponding signal is delivered from the pump control unit 3, which computes the pumping capacity Q.

To compute or estimate the negative pressure gain, the negative pressure estimation unit 2 considers various factors, like the prevailing negative pressure $p_{BKV}$, the resultant pressure difference between the vacuum pump 4 and brake booster 6, a resultant degree of opening of a check valve, and the like. For this purpose, calculations do not necessarily have to be done, instead look-up tables can be accessed, which are stored for example in the negative pressure estimation unit 2.

The pump control unit 3 compares the value of the negative pressure $p_{BKV}$ received from the negative pressure estimation unit 2 with an internally stored minimum value and begins an activation of the vacuum pump 4 if the minimum value is undershot. Here, the pump control unit 3 estimates the activation period for which and/or the electrical power at which the vacuum pump 4 must be switched on in order to re-establish the necessary negative pressure. Besides the difference between negative pressure $p_{BKV}$ and minimum value, the activation period also depends on various other factors, like the volume of the brake booster 6 and the dimensioning of a connection between the vacuum pump 4 and brake booster 6. The latter factors need not be explicitly included in a calculation, and instead it is possible to learn from a look-up table how long the vacuum pump 4 must be operated at a specific pumping capacity Q to compensate for a specific pressure difference. If the activation period is fixedly predefined, it is likewise possible to learn from a look-up table which pumping capacity Q is necessary to compensate for the pressure difference in this activation period. A necessary electrical power can be derived from the pumping capacity Q.

However, the pumping capacity Q is not the same with each activation. On the one hand, the electrical power supplied to the vacuum pump 4 is subject to fluctuations, which for example can be linked to the state of charge of an associated battery or to the fact that further loads are connected to the battery at the same time. To consider such potential fluctuations, the pump control unit 3 taps the supply voltage U, providing the available electrical power at a specific vacuum pump 4. Optionally, the pump control unit 3 can also predefine a target power of the vacuum pump 4 by pre-defining a target voltage $U_{target}$, whereby the supply voltage U is actively influenced. However, the actual pumping capacity Q is not constant over time, even with continuously constant supply voltage U. Rather, the efficacy of the vacuum pump 4 decreases over time. This depends on the age of the pump, in other words the time since installation thereof, and on the actual total operating period of the pump, i.e. the sum of the periods of time the pump has been activated. Since the pump control unit 3 controls the activation time periods itself, it requires no further input signal, but instead can record these and add them together through an internal timer. To record the age of the vacuum pump 4, it compares a current data item with a stored installation data item of the vacuum pump 4. Alternatively, upon installation of the vacuum pump 4 a timer of the pump control unit 3 could be set to zero. The influence of age and total operating period likewise does not necessarily have to be computed by the pump control unit 3, but can be accessed here, as well through look-up tables, which for example have been learned because of tests.

As shown in the present example, the system and method for actuating an electric vacuum pump 4 associated with the brake booster 6 and connected in such a way it generates a negative pressure or a (partial) vacuum in the brake booster 6. The brake booster 6 is part of a brake system 8 of a motor vehicle 10, which for example is electrically driven or has a hybrid drive. With vehicles of this type, an electric vacuum pump is usually used, i.e. a vacuum pump driven through an electric motor. One or more batteries of the motor vehicle 10 form the power source for operation of the vacuum pump.

The vacuum estimation unit 2 of the control device 1 indirectly ascertains a negative pressure in the brake booster. Depending on the indirectly ascertained negative pressure and on a pumping capacity of the vacuum pump 4, the control device 1 ascertains at least one activation parameter for the vacuum pump 4 and activates the vacuum pump 4 in accordance with the at least one activation parameter, when the indirectly ascertained negative pressure drops below a predefined minimum value. The indirect ascertainment of the negative pressure means that the vacuum or negative pressure is not directly measured by a sensor, instead the negative pressure is indicated on the basis of other measured values or operating parameters of the motor vehicle 10. The ascertainment of the negative pressure performed in this way may be inaccurate to a certain extent, such that the identified negative pressure may deviate from the negative pressure actually prevailing. It is possible to dispense with a pressure sensor specially provided in the brake booster, thereby eliminating the problems associated therewith in terms of costs, weight, etc.

The pressure difference between an ambient pressure in the ambient surroundings of the brake booster and the pressure prevailing in the brake booster is referred to as negative pressure. If, for example, the ambient pressure is 1 bar and the pressure in the brake booster is 0.1 bar, a negative pressure of 0.9 bar prevails. For optimal or sufficient operation of the brake booster, a minimum value can be pre-specified in this respect by the factory and stored in the control device 1 or in a memory that the control device can access. As long as the negative pressure lies above this minimum value, operation of the vacuum pump is unnecessary. The control device 1 implements activation of the vacuum pump when the negative pressure falls below the minimum.

Various possibilities are conceivable on how the negative pressure can be indirectly ascertained without being measured directly. In one example, the control device 1 ascertains the negative pressure by setting off a negative pressure loss caused by the operation of the brake booster against a negative pressure gain obtained by the operation of the vacuum pump, this preferably by the control device 1. For example, the control device 1 starts from a known starting value of negative pressure, for example when the vehicle starts up the negative pressure normally corresponds to a value of zero. The control device 1 records the negative pressure loss and negative pressure gain, and changes the value of the negative pressure accordingly. Any operation of the main brake cylinder, i.e. any braking request with the aid of the brake system, generally leads to a negative pressure loss in the brake booster. By contrast, as a result of the operation of the vacuum pump, a negative pressure gain can be obtained in the brake booster in the sense of an improvement of the brake assistance force provided by the brake booster. The above-mentioned negative pressure loss in the brake booster is set off against, or balanced with, the above-mentioned negative pressure gain in the brake booster to determine the momentary negative pressure. The temporal profile of the negative pressure loss and the temporal profile of the negative pressure gain are summed continuously or quasi-continuously, where the negative pressure loss has an opposite sign compared with the negative pressure gain. The pressure, in particular negative pressure, prevailing momentarily in the brake booster and available to assist the braking force, can be computed or estimated from the balance of the negative pressure loss and negative pressure gain in the brake booster computed continuously or quasi-continuously over time.

The particular negative pressure gain or negative pressure loss can be ascertained for a certain vehicle from other measured values or parameters, without the need for a pressure measurement in the brake booster. The control device 1 by way of example ascertains the negative pressure loss based on an ambient pressure prevailing in the ambient surroundings of the brake booster and based on a hydraulic brake pressure or an operation travel of a brake pedal. In particular, the negative pressure loss can be ascertained exclusively based on specified variables. The negative pressure loss in the brake booster because of an operation of the brake, in particular a main brake cylinder, can be determined by the hydraulic brake pressure and by the ambient pressure prevailing in the ambient surroundings of the brake booster. This is possible since a specific hydraulic pressure corresponds to a specific travel of a piston in the brake booster, thus providing the amount of air, at ambient pressure, that has flowed into the brake booster. In this respect, the degree of opening of the valves can be determined, where, on this basis, the volume flow into the brake booster can be determined. In principle, the degree of opening of the valves is provided by the pedal travel or the position of the piston, determined from the measured hydraulic pressure, and on the prevailing pressure conditions in the brake booster. Since a hydraulic pressure sensor, normally present in modern vehicles, can detect the hydraulic pressure in the main brake cylinder implementation in a vehicle of this type merely requires detection of the ambient pressure. In many vehicles, the ambient pressure is available for other purposes and there is no additional hardware outlay. Alternatively or additionally, to measure the hydraulic brake pressure, the operation travel of the brake pedal, the distance which the brake pedal is pressed down, can be used as it normally corresponds to a specific travel of the piston in the brake booster. Since the operation travel of the brake pedal, in the case of vehicles having an electric vacuum pump, is normally recorded, there is no need in this case either for any additional hardware outlay.

In accordance with an additional example, the control device 1 ascertains the negative pressure gain based on the pumping capacity of the vacuum pump. Other variables may also play a part. For example, the size and geometry of a connecting line between the vacuum pump and the brake booster and a check valve typically provided are considered. A check valve of this type, which prevents a pressure balance when a lower pressure prevails in the vacuum pump than in the brake booster, normally has a variable degree of opening. This degree of opening is dependent on a pressure difference between the vacuum pump and the brake booster, i.e. the greater the pressure difference is, the further the check valve opens. The pressure difference is in turn dependent on the pressure in the brake booster and on the pressure in the vacuum pump. The latter can be determined again with the aid of the capacity of the vacuum pump.

The control device determines at least one activation parameter considered suitable for compensating for the pressure difference, i.e. for bringing the negative pressure at least back to the minimum value, and above where appropriate. Various variables can be used as activation parameters, by means of which the activation of the vacuum pump can be characterized, for example the duration of the activation, the supplied power, a rotational speed of a motor of the pump, etc. At least one of these activation parameters is not fixedly pre-specified, but is determined to a certain extent, where the indirectly ascertained negative pressure and the available pumping capacity of the vacuum pump are used for the determination. The minimum value is also, at least implicitly, included in the determination, since the goal is to reach at least the minimum value or typically a negative pressure considerably above the minimum value. The pumping capacity does not designate the electrical power, but the volume flow produced by the vacuum pump, i.e. volume per unit of time measured, for example, in liters per second. Based on pumping capacity, it is possible to at least estimate those parameters with which the vacuum pump must be operated in order to re-establish the intended negative pressure. The vacuum pump is set in operation as necessary and only set in operation for the necessary duration, at the necessary power, etc.

The control device 1 can be formed in one or more parts and its essential functions can be provided primarily through software. For example, a first module provided by way of hardware or software may be responsible for the indirect ascertainment of the negative pressure, whereas the second module is responsible for the ascertainment of at least one activation parameter.

In one example, it is preferable that the control device 1 indirectly ascertains the pumping capacity as a time-dependent value. The control device 1 considers that the pumping capacity is different each time the vacuum pump is switched on, but that a time dependency may be present. In this respect, the time dependency does not relate to the change in time between switch-on and switch-off, but to possible changes between individual activations of the vacuum pump or in individual activations. This approach provides an improved estimation of the necessary activation parameters compared with using a pumping capacity constant over time as a starting point. As disclosed, the pumping capacity is indirectly identified, not measured directly, and for example based on parameters of the pump or properties of the pump.

The control device 1 ascertains the pumping capacity of the vacuum pump 4 depending on the electrical power supplied to the vacuum pump 4. The control device 1 considers that the power provided by the vehicle 10 to the vacuum pump 4 might not be constant. For example, the electrical power used by the vacuum pump 4 can vary based on the state of charge of the battery or because of other power loads accessing the battery besides the vacuum pump 4. For example, if the vacuum pump 4 is operated with DC voltage, the active power is normally considered exclusively, not the reactive power. The consumed electrical power can be measured, as known, with little effort. The pumping capacity need not be computed from the electrical power, but, where appropriate, can be read from a stored look-up table.

In accordance with another example, the electrical power is purposefully influenced where an electrical target power to be supplied to the vacuum pump is ascertained as activation parameter, and the vacuum pump is activated for the activation period in accordance with the target power. This includes the possibility that the target power is variable, i.e. is not constant over time, during the activation period. The target power can be pre-specified via an associated variable, for example voltage or current.

While the activation period is also ascertained as activation parameter, it is conceivable in principle, for the activation period to be constant and for the activation to influence the vacuum pump only through the target power. Where both the activation period and the target power are ascertained, these can be matched to one another in different ways to achieve an intended negative pressure gain. For example, a longer activation period may compensate for a slightly lower target power. The electrical power that can be supplied to the vacuum pump can fluctuate or can be limited, for example by the state of charge of a battery or because of the access of other power consumers. It is therefore conceivable for the power supplied to deviate from the intended target power. In this respect, reference can also be made, with regard to the supplied electrical power, to an actual power.

Even if the electrical power is always the same, the actual pumping capacity can decrease with the age of the pump. Based on aging effects of the materials from which the pump is constructed, whereby, for example, the dimensional stability of specific component parts can deteriorate. This can affect the efficacy of the pump. In one example, the method and system provides for the control device 1 to ascertain the pumping capacity in dependence of an age of the vacuum pump 4. The term "age" denotes the period of time from the installation of the vacuum pump 4 in the vehicle 10. To ascertain this, the control device 1 either can have its own timer or can have access to a current data item, which is compared with a stored installation data item of the vacuum pump 4. To ascertain the pumping capacity, reference can be made again, as set forth in prior examples, to a look-up table stored in the control device or at other locations.

Whereas aging effects, up to a certain extent, arise independently of the operation of the vehicle or of the vacuum pump, vacuum pump 4 operation greatly intensifies or accelerates these effects. In another example, the control device 1 ascertains the pumping capacity in dependence of a total operating period of the vacuum pump 4. The time intervals during which the vacuum pump 4 operates are recorded and added together, preferably by the control device 1. An expected decrease of the pumping capacity, possibly determined by way of experiment, can be assumed and likewise can be taken from a stored table. In particular, the combination of influences of the total operating period and those of the age of the vacuum pump can be considered.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for actuating an electric vacuum pump of a brake booster comprising the steps of:
   indirectly ascertaining a negative pressure loss in the brake booster;
   determining a pumping capacity of and ascertaining at least one activation parameter for the vacuum pump;
   activating the vacuum pump based on said at least one activation parameter when the ascertained negative pressure loss exceeds a predefined value until a negative pressure gain generated by said vacuum pump equals said negative pressure loss.

2. The method of claim 1 wherein the negative pressure loss is caused by the operation of the brake booster and is set off against the negative pressure gain attained by the operation of the vacuum pump.

3. The method of claim 2 wherein the negative pressure loss is ascertained based on an ambient pressure prevailing in the ambient surroundings of the brake booster and a hydraulic brake pressure.

4. The method of claim 2 wherein the negative pressure loss is ascertained based on an ambient pressure prevailing in the ambient surroundings of the brake booster and an operation travel of a brake pedal.

5. The method of claim 2 wherein the negative pressure gain is based on the pumping capacity of the vacuum pump.

6. The method of claim 1 wherein said at least one activation parameter includes an activation period and activating the vacuum pump for the activation period.

7. The method of claim 1 wherein the pumping capacity is a time-dependent value.

8. The method of claim 1 wherein the pumping capacity is based on electrical power supplied to the vacuum pump.

9. The method of claim 1 wherein the pumping capacity is based on a total operating period of the vacuum pump.

10. A method for actuating an electric vacuum pump of a brake booster using a control device comprising the steps of:
    indirectly ascertaining a negative pressure in the brake booster; and
    depending on the indirectly ascertained negative pressure and on a pumping capacity of the vacuum pump at least one activation parameter for the vacuum pump is ascertained and the vacuum pump is activated in accordance with said at least one activation parameter for an activation period when the indirectly ascertained negative pressure drops below a predefined minimum value wherein an electric target power to be supplied to the vacuum pump is ascertained as said at least one activation parameter, and the vacuum pump is activated during the activation period in accordance with the target power.

11. The method of claim 10 wherein a negative pressure loss caused by the operation of the brake booster is set off against a negative pressure gain attained by the operation of the vacuum pump.

12. The method of claim 11 wherein the negative pressure gain is ascertained based on the pumping capacity of the vacuum pump.

13. The method of claim 10 wherein the pumping capacity is based on the total operating period of the pump.

14. The method of claim 10 wherein the negative pressure loss is ascertained based on an ambient pressure prevailing in ambient surroundings of the brake booster and based on a hydraulic brake pressure operation travel of a brake pedal.

15. A method for actuating an electric vacuum pump of a brake booster using a control device comprising the steps of:
    indirectly ascertaining a negative pressure loss in the brake booster; and
    depending on the indirectly ascertained negative pressure loss and on a pumping capacity of the vacuum pump ascertaining at least one activation parameter for the vacuum pump, and activating the vacuum pump in accordance with at least one activation parameter when the indirectly ascertained negative pressure loss exceeds a predefined minimum value to provide a negative pressure gain equal to said negative pressure loss.

16. The method of claim 15 including the steps of ascertaining an activation period as an activation parameter; and activating the vacuum pump for the activation period.

17. The method of claim 15 wherein the pumping capacity is indirectly ascertained as time-dependent value.

18. The method of claim 15 wherein the pumping capacity is ascertained depending on an electrical power supplied to the vacuum pump.

19. A method for actuating an electric vacuum pump of a brake booster comprising the steps of:

indirectly ascertaining a negative pressure in the brake booster;

determining a pumping capacity of and ascertaining at least one activation parameter for the vacuum pump; and activating the vacuum pump based on said at least one activation parameter for an activation period when the ascertained negative pressure drops below a predefined minimum value wherein said at least one activation parameter includes an electric target power to be supplied to the vacuum pump and activating the vacuum pump during the activation period based on the target power.

20. A method for actuating a brake booster vacuum pump comprising:

indirectly ascertaining a negative pressure loss in the brake booster;

determining a pumping capacity of the vacuum pump;

activating the vacuum pump using a target power supplied to the vacuum pump for an activation period based on the target power when the negative pressure loss exceeds a predefined value; and said activation period resulting in a negative pressure gain equaling said negative pressure loss.

* * * * *